March 3, 1959
R. H. CARTER
2,875,694
MOTOR DRIVEN PUMPS
Filed Sept. 8, 1954
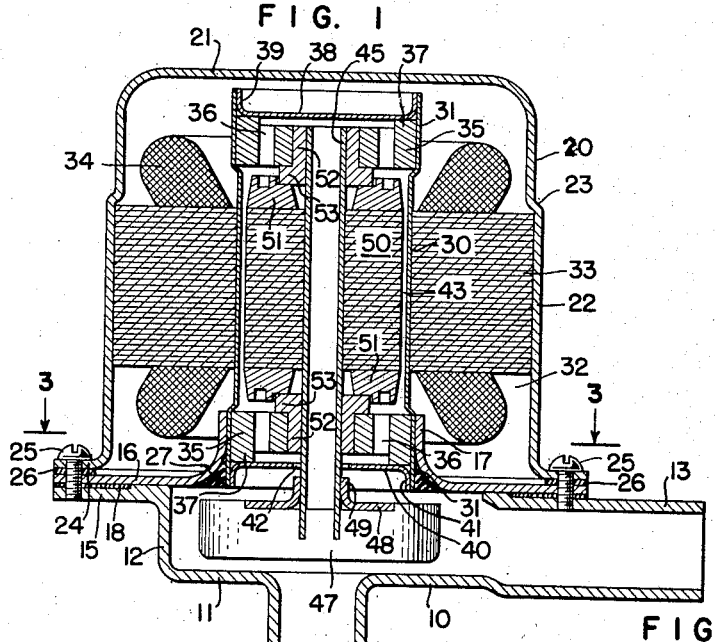
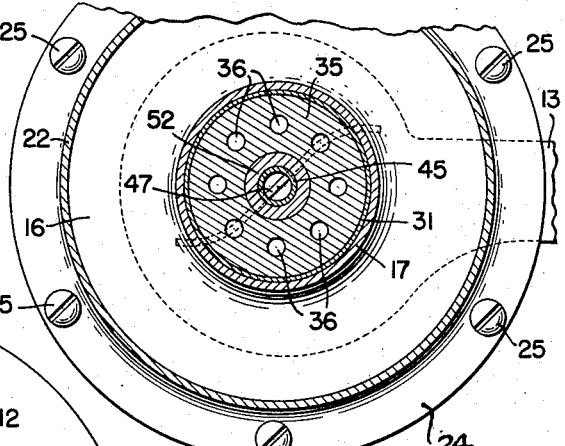
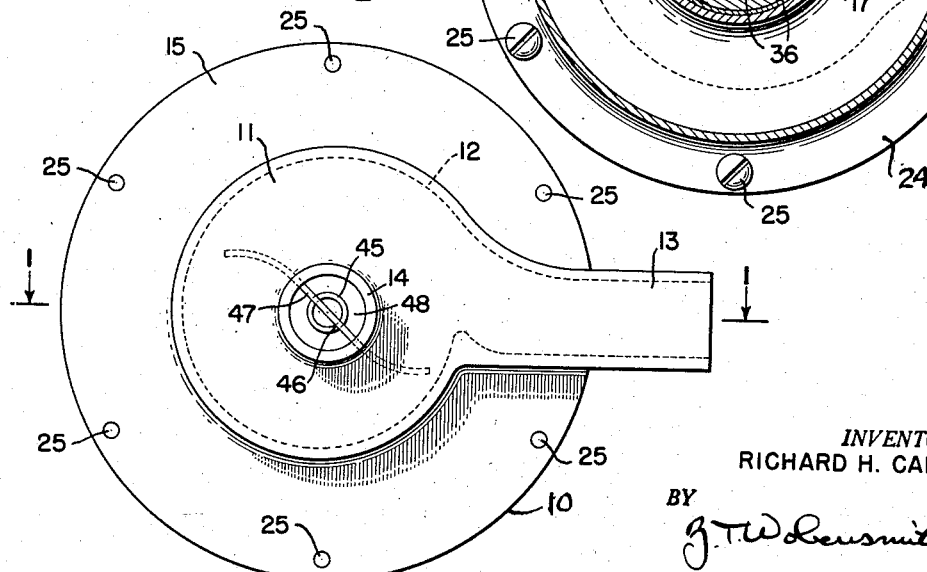
INVENTOR.
RICHARD H. CARTER
BY
ATTORNEY.

United States Patent Office 2,875,694
Patented Mar. 3, 1959

2,875,694

MOTOR DRIVEN PUMPS

Richard H. Carter, Fostoria, Ohio, assignor to The Fostoria Pressed Steel Corporation, Fostoria, Ohio, a corporation of Ohio Application September 8, 1954, Serial No. 454,727

9 Claims. (Cl. 103—87)

This invention relates to motor driven pumps.

It is the principal object of the present invention to provide a motor driven pump which is simple in construction, has a relatively small number of constituent parts, and which is easy to assemble.

It is a further object of the present invention to provide a motor driven pump having an enclosed motor rotor chamber in which the enclosure is accomplished in an improved manner.

It is a further object of the present invention to provide a motor driven pump having a cylindrical separator interposed between the motor rotor and the motor stator which functions as a support for the motor and pump rotor and the bearings therefor.

It is a further object of the present invention to provide a motor driven pump having an enclosed motor rotor chamber in communication with the fluid being pumped and with an improved character of fluid circulation therethrough for cooling and for lubrication.

It is a further object of the present invention to provide a motor driven pump in which the necessity for stuffing boxes and rotating shaft seals is eliminated.

Other objects and advantageous features of the invention will be apparent from the specification and claims.

The nature and characteristic features of the invention will be more readily understood from the following description, taken in connection with the accompanying drawings forming part thereof, in which:

Figure 1 is a vertical central sectonal view of a preferred form of motor driven pump in accordance with the present invention;

Fig. 2 is a bottom plan view of the pump shown in Fig. 1; and

Fig. 3 is a horizontal sectional view taken approximately on the line 3—3 of Fig. 1.

It should, of course, be understood that the description and drawings herein are illustrative merely, and that various modifications and changes may be made in the structure disclosed without departing from the spirit of the invention.

Like numerals refer to like parts throughout the several views.

While the motor driven pump hereinafter described has been shown in a particular position it may be operated in an inverted position, on either side, or in an inclined position.

Referring now more particularly to the drawings, the motor driven pump therein illustrated preferably includes a pump housing 10, preferably made as an integral casting, having a lower end wall 11, and a side wall 12 therein providing a scroll, the wall 11 having a side fluid delivery connection 13. An end fluid inlet connection 14 is provided in the end wall 11, centrally axially aligned with respect to the scroll. At the margins of the wall 12, opposite the fluid inlet connection 14, an outwardly extending flange 15 is provided.

The pump housing 10, opposite the wall 11 is closed by a closure plate 16 which is secured to the flange 15 and has an upwardly extending central axial flange 17. A replaceable ring gasket 18 is preferably interposed between the flange 15 and the closure plate 16 for sealing to prevent fluid leakage at this location.

An outer casing 20 is provided, of sheet metal or the like, having an upper end wall 21, a cylindrical side wall 22 with an offset 23 therein, and an outwardly extending end flange 24 in engagement with the plate 16 and held with the plate 16 in fixed relation to the flange 15 by the studs 25. While the casing 20 may be vented to the atmosphere if desired, where submerged or vapor proof operation is required, and with a closed casing 20, a gasket 26 may be provided between the flange 24 and the plate 16.

A cylindrical sleeve 30 is provided, of non-magnetic responsive material such as stainless steel, having cylindrical end enlargements 31, the inner of which has the exterior thereof in tight relation such as by a press fit, with the interior surface of the flange 17. In order to prevent fluid leakage at this location a seal 27 is provided by welding, sealing compound or solder.

The space within the casing 20 and outside the sleeve 30 provides a motor stator chamber 32 which is separated and isolated from the fluid being pumped so that no pumped fluid can enter. Within the motor stator chamber 32, and preferably in engagement with the sleeve 30, motor stator laminations 33 and field windings 34 are provided, the windings 34 having power leads (not shown) connected to any suitable source of alternating current. The casing 20 is preferably in engagement with the peripheral portions of the laminations 33 and the offset 24 engages the outermost of the laminations 33.

Within each of the end enlargements 31 of the sleeve 30 and in tight engagement with the interior surface thereof, bearing rings 35 are provided, preferably of graphite or the like, the rings 35 having openings 36 therethrough for fluid circulation, and annular spacing rims 37. At the outer end of the outer enlargement 31, an end closure plate 38 is provided having an outwardly extending axial rim 39 in engagement with the rim 37 of the outermost bearing ring 35, in spaced relation to the openings 36, and in tight engagement with the inner surface of the outer of the enlargements 31 to provide a fluid tight joint, welding, sealing compound or solder being employed if desired to insure fluid tightness.

At the inner end of the inner enlargement 31, an inner end plate 40 is provided having an inwardly extending axial rim 41, in engagement with the rim 37 of the innermost bearing ring 35, in spaced relation to the openings 36, and in tight engagement with the inner surface of the inner of the enlargements 31 to prevent dislodgement. The end plate 40 has a central opening 42. A motor rotor chamber 43 is thus provided within the interior of the sleeve 30 and between the plates 38 and 40.

A rotor is provided which preferably includes a hollow tubular shaft 45 having an end portion extending through the central opening 42 and into the scroll 12 and with a diametrical end slot 46, for the reception of a fluid impeller blading 47, made of sheet metal or the like, and of the desired shape. An impeller or fluid guide plate 48 is preferably provided, having a flange 49 in engagement with the exterior of the shaft and to which the impeller blading 47 can be secured.

It will be noted that the blading 47 does not close the end of the shaft 45 on which it is mounted.

At the central portion of the shaft 45, radially interiorly of stator laminations 33, motor rotor laminations 50, preferably of the short circuited type are provided, preferably with a press fit on the shaft 45 and with a running clearance with respect to the interior of the sleeve 30.

Beyond the laminations 50, annular end rings 51 are provided with which cylindrical collars 52, preferably of bronze or other suitable material, are in engagement at each end. The collars 52 are preferably applied on the shaft 45 with a press fit and have outwardly extending annular shoulders 53. The cylindrical portions of the collars 52 engage the inner cylindrical surfaces of the rings 35 to provide radial bearings and the diametrical faces of the shoulders 53 engage the facing ends of the rings 35 to provide axial thrust bearings.

The end closure plates 38 and 40 and the shaft 45, as well as the pump housing 10 can be made of any suitable material which is resistant to corrosion by the fluids being pumped. For certain liquids, stainless steel is preferred.

The mode of operation will now be pointed out.

Upon energization of the field windings 34, the rotating field set up in the stator laminations 33 is effective upon the motor rotor laminations 50 for rotating the shaft 45 and the impeller blading 47 carried thereby.

Fluid enters at the fluid inlet connection 14, is rotated by the impeller blading 47, is guided by the impeller plate 48 and is delivered to the fluid delivery connection 13.

As the fluid is being pumped, a portion thereof, outwardly of the outer margins of the impeller plate 48, passes through the opening 42 in the plate 40, the openings 36 in the inner bearing ring 35, axially outwardly in the clearance space between the rotor laminations 48 and the interior of the sleeve 30, the openings 36 in the outer bearing ring 35, around the interior of end closure plate 38 and axially inwardly through the interior of the shaft 45 to the impeller blading 47 where it mixes with the other portions of the fluid acted on by the impeller blading 47 for discharge.

The bypassed portion of the fluid is effective for cooling of the motor stator and motor rotor and for lubrication of the bearing surfaces between the rings 35 and the collars 52.

Access to the impeller blading 47 and to the interior of the pump housing 10, as well as to the motor stator may be readily had by removal of the studs 25.

The motor driven pump heretofore described can be made in small sizes of the order of one twentieth horsepower and larger, where the sleeve 30, without being of excessive thickness so as to unduly reduce the motor efficiency, still has adequate strength to support the rotor bearings and rotor assembly.

I claim:

1. A motor driven pump having a pump housing with an interior pumping chamber and fluid inlet and outlet connections in communication with said pumping chamber, a closure member for one end of said pump housing, a cylindrical sleeve carried by said closure member axially disposed with respect to said pumping chamber, said sleeve having space bearing positioning end portions of different size from said sleeve, a closure for the outer end of said sleeve at one of said end portions, the interior of said sleeve providing a motor rotor chamber, spaced bearing members in said sleeve and in engagement with said end portions, a hollow shaft axially disposed in said sleeve and extending into said pumping chamber whereby the fluid from said pumping chamber may circulate through said motor rotor chamber and said shaft, an impeller on said shaft in said pumping chamber, additional bearing members on said shaft in spaced relation and in engagement with said first bearing members, a motor rotor on said shaft between said additional bearing members, and a motor stator externally disposed with respect to and in engagement with said sleeve and surrounding said motor rotor.

2. A motor driven pump having a pump housing with an interior pumping chamber and fluid inlet and outlet connections in communication with said pumping chamber, a closure member for one end of said pump housing, a cylindrical sleeve carried by said closure member axially disposed with respect to said pumping chamber, said sleeve having spaced bearing positioning end portions, a closure for the outer end of said sleeve at one of said end portions, the interior of said sleeve providing a motor rotor chamber, spaced bearing members in said sleeve and held in spaced relation by said end portions, a hollow shaft axially disposed in said sleeve and extending into said pumping chamber, an impeller on said shaft in said pumping chamber, additional bearing members on said shaft in spaced relation and in engagement with said first bearing members, certain of said bearing members having openings therethrough for fluid delivery through a path including said bearing member openings and said shaft, a motor rotor on said shaft between said additional bearing members, and a motor stator externally disposed with respect to and in engagement with said sleeve and surrounding said motor rotor.

3. A motor driven pump having a pump housing with an interior pumping chamber and fluid inlet and outlet connections in communication with said pumping chamber, a closure member for one end of said pump housing, a cylindrical sleeve carried by said closure member axially disposed with respect to said pumping chamber, said sleeve having spaced bearing positioning end enlargements, a closure for the outer end of said sleeve, the interior of said sleeve providing a motor rotor chamber, spaced bearing members fixedly mounted in and held in spaced relation by said end enlargements, a hollow shaft axially disposed in said sleeve and extending into said pumping chamber whereby the fluid from said pumping chamber may circulate through said motor rotor chamber and said shaft, an impeller on said shaft in said pumping chamber, additional bearing members fixedly mounted on said shaft in spaced relation and in engagement with said first bearing members, a motor rotor on said shaft between said additional bearing members, and a motor stator externally disposed with respect to and in engagement with said sleeve and surrounding said motor rotor.

4. A motor driven pump comprising a pump housing with an interior pumping chamber and fluid inlet and outlet connections in communication with said pumping chamber, said pump housing having a terminal flange, a closure member for said pump housing having a portion for engagement with said flange, a motor housing in engagement with said closure member and extending axially from said pumping chamber, said closure member having a central rim, a cylindrical sleeve axially disposed in said motor housing and having opposite bearing positioning end portions the inner of which is in engagement with said rim, a closure for the outer end portion of said sleeve, a closure for the inner end portion of said sleeve and having a central opening, the interior of said sleeve providing a motor rotor chamber, spaced bearing members in said end portions, a hollow shaft centrally axially disposed in said sleeve and extending through said sleeve closure opening and into said pumping chamber whereby the fluid from said pumping chamber may circulate through said motor rotor chamber and said shaft, an impeller on said shaft in said pumping chamber, additional bearing members mounted on said shaft in spaced relation and in engagement with said first bearing members, a motor rotor fixedly mounted on said shaft between said additional bearing members, and a motor stator in engagement with said sleeve interposed between said sleeve and said motor housing and surrounding said motor rotor.

5. A motor driven pump comprising a pump housing with an interior pumping chamber and fluid inlet and outlet connections in communication with said pumping chamber, said pump housing having a terminal flange, a closure member for said pump housing having a portion for engagement with said flange, a motor housing in engagement with said closure member, said motor housing extending axially from said pumping chamber, said closure member having a central axial rim, a cylindrical sleeve axially disposed in said motor housing and having opposite spaced bearing positioning end portions the inner of which is in engagement with said rim, a closure for the outer end of said sleeve, a closure for the inner end of said sleeve and having a central opening, the interior of said sleeve providing a motor rotor chamber, spaced bearing members fixedly mounted in and held in spaced relation by said end portions, a hollow shaft centrally axially disposed in said sleeve and extending through said sleeve closure opening and into said pumping chamber, an impeller on said shaft in said pumping chamber, additional bearing members fixedly mounted on said shaft in spaced relation and in engagement with said first bearing members, a motor rotor fixedly mounted on said shaft between said additional bearing members, and a motor stator in engagement with said sleeve interposed between said sleeve and said motor housing and surrounding said motor rotor.

6. A motor driven pump comprising a pump housing with an interior pumping chamber and fluid inlet and outlet connections in communication with said pumping chamber, said pump housing having a terminal flange, a closure member for said pump housing having a portion for engagement with said flange, a motor housing in engagement with said closure member, said motor housing extending axially from said pumping chamber, said closure member having a central axial rim, a cylindrical sleeve axially disposed in said motor housing and having spaced bearing positioning end enlargements one of which is in engagement with said rim, a closure for the outer end of said sleeve, a closure for the inner end of said sleeve and having a central opening, the interior of said sleeve providing a motor rotor chamber, spaced bearing members fixedly mounted in and held in spaced relation by said end enlargements, a hollow shaft centrally axially disposed in said sleeve and extending through said sleeve closure opening and into said pumping chamber, an impeller on said shaft in said pumping chamber, additional bearing members fixedly mounted on said shaft in spaced relation and in engagement with said first bearing members, a motor rotor fixedly mounted on said shaft between said additional bearing members, and a motor stator in engagement with said sleeve interposed between said sleeve and said motor housing and surrounding said motor rotor, certain of said bearing members having openings therethrough for fluid delivery from said pumping chamber through a path including said sleeve closure opening, said bearing member openings and said shaft back to said pumping chamber.

7. A motor driven pump comprising a pump housing with an interior pumping chamber and fluid inlet and outlet connections in communication with said pumping chamber, said pump housing having a terminal flange, a closure member for said pump housing having a portion for engagement with said flange, a motor housing having a cylindrical portion closed at its outer end and having a terminal flange at its inner end in engagement with said closure member, said motor housing extending axially from said pumping chamber, said closure member having a central rim, a cylindrical sleeve axially disposed in said motor housing and having spaced bearing positioning end enlargements one of which is in engagement with said rim, a closure for the outer end of said sleeve, a closure for the inner end of said sleeve and having a central opening, the interior of said sleeve providing a motor rotor chamber, spaced bearing members fixedly mounted in and held in spaced relation by said end enlargements, a hollow shaft centrally axially disposed in said sleeve and extending through said sleeve closure opening and into said pumping chamber, an impeller on said shaft in said pumping chamber, additional bearing members fixedly mounted on said shaft in spaced relation and in engagement with said first bearing members, a motor rotor fixedly mounted on said shaft between said additional bearing members and in closely spaced relation to said sleeve, and a motor stator in engagement with said sleeve interposed between said sleeve and said motor housing and surrounding said motor rotor, certain of said bearing members having openings therethrough for fluid delivery from said pumping chamber through a path including said sleeve closure opening, said bearing member openings and the clearance space between said motor rotor and said sleeve and the interior of said shaft back to said pumping chamber.

8. A motor driven pump comprising: a pump housing and a motor rotor housing having a wall between them, said rotor housing comprising a sleeve having its axis perpendicular to said wall and being supported at one end by said wall and being closed at its other end, a pair of bearings mounted in axial alignment near opposite ends of and with said sleeve, a hollow shaft journalled in said bearings and extending through said wall into said pump housing whereby the fluid from said pump housing may circulate through said rotor housing and said shaft, a rotor mounted on said shaft between said bearings, and a stator engaging the outside of said sleeve, whereby said sleeve supports said rotor and said bearings in axial alignment from the support of said sleeve by said wall.

9. A motor driven pump comprising: a pump housing and a motor rotor housing having a wall between them, said rotor housing comprising a sleeve having its axis perpendicular to said wall and being supported at one end by said wall and being closed at its other end, said wall within said sleeve having an aperture for communication between said pump and said rotor housings, a pair of bearings mounted in axial alignment near opposite ends of and with said sleeve, each of said bearings having a plurality of apertures therethrough, a hollow shaft journalled in said bearings and extending through said aperture in said wall into said pump housing, a rotor mounted on said shaft between said bearings, an impeller mounted on said shaft in said pump housing, and a stator engaging the outside of said sleeve, whereby said sleeve supports said rotor and said bearings in axial alignment from the support of said sleeve by said wall and the fluid from said pump housing may circulate through said rotor housing and said shaft.

References Cited in the file of this patent

UNITED STATES PATENTS

| 2,004,866 | Haldeman | June 11, 1935 |
| 2,310,761 | Daiger | Feb. 9, 1943 |
| 2,603,161 | Lloyd | July 15, 1952 |
| 2,669,187 | Guyer | Feb. 16, 1954 |

FOREIGN PATENTS

| 289,479 | Switzerland | Mar. 15, 1953 |